FIG. 1.

INVENTORS
HOWARD M. SONTAG
MILTON BERNHARDT
BY
Burgess, Dinklage & Sprung
ATTORNEYS.

United States Patent Office 3,475,751
Patented Oct. 28, 1969

3,475,751
REMOTE SOUND MONITORING AND CONTROL SYSTEM
Howard M. Sontag, Roslyn, and Milton Bernhardt, Cambria Heights, N.Y., assignors to Executone, Inc., Long Island City, N.Y.
Filed July 7, 1966, Ser. No. 563,430
Int. Cl. G08b 1/08
U.S. Cl. 340—416    14 Claims

ABSTRACT OF THE DISCLOSURE

A monitoring and control system having a transducer for sensing sounds in the area to be monitored and for generating an electric signal in accordance with the sound intensity, a transmission line for transmitting the electric signal to a remote location at which a signal receiving circuit is disposed which is responsive to the electric signal so as to derive therefrom an output signal corresponding to the sound intensity, a signal applying circuit coupled to one end of the transmission line so as to superimpose a characteristic DC control signal on the transmission line for reception at the other end, and a control signal receiving circuit coupled to the other end of the transmission line for receiving the control signal and responding thereto. Preferably, the characteristic DC control signal is imposed whenever the output signal corresponds to a predetermined level of sound intensity at the monitored area.

---

This invention relates in general to the audio intercommunication and remote control arts. More particularly, the invention is directed to a system for monitoring the sound level at a given area from a remote location, and which includes means for transmitting auxiliary signals for control purposes and/or additional monitoring functions between such remote location and the monitored area over the same transmission line used for sound level monitoring.

Essentially, the system of the invention provides a sound sensing circuit means including one or more transducers disposed for sensing sounds within the area to be monitored and converting such sounds into corresponding audio signals, circuit means defining an audio transmission line coupled to the sound sensing circuit means for transmitting audio signals therefrom to the remote location, and audio signal receiving circuit means including a rectifier, disposed at the remote location and coupled to the audio line to receive the audio signals and to derive therefrom a DC signal corresponding to their amplitude and representing the level of sound intensity at the monitored area. The portion of the system thus described performs the function of creating a signal at the remote monitoring location which is a measure of the sound level existing at the monitored area and which can be further utilized for detecting the occurrence of events at the monitored area which result in departures from the normal sound intensity level thereat.

Since there is an audio transmission line already provided between the monitored area and the remote monitoring location for sound level monitoring purposes, the invention utilizes this same audio line for carrying additional signals, preferably DC voltage level signals, for remote control purposes between the monitored area and the remote location. According to the invention, the system includes signal applying circuit means coupled to one end of the audio line for superimposing one or more of such control signals thereupon for reception at the other end of the audio line by a control signal receiving circuit means coupled thereto. The control signals thus received can be utilized either directly or indirectly for effecting the performance of corresponding predetermined functions through conventional control devices, such as relays, switches, etc.

In general, the system of the invention can be constructed in one or more embodiments which feature capabilities for transmitting control signals from the monitored area to the remote location, and/or for transmitting control signals from the remote location to the monitored area, all in addition to the sound level monitoring function and over the same audio transmission line provided therefor.

By assigning a definite DC voltage level to each individual control signal, the system is rendered capable of carrying a variety of distinct control signals, one at a time without confusion, and limited in number only by the available DC voltage that can be safely superimposed upon the audio line, and the resolving capability of the control signal receiving circuits. For example, if a 24 volts DC supply is available, and the control signal receiving circuits can reliably resolve signal voltages differing from one another by 6 volts, then four non-zero signal voltage levels are available, namely 6, 12, 18 and 24 volts DC.

Such DC voltages can be readily superimposed upon the audio line through a simplex coupling arrangement between the sound sensing circuit means at the monitored area end of the audio line and the audio signal receiving circuit means at the remote location end thereof. This is accomplished by coupling the sound sensing circuit means to the audio line through a transformer having a center-tapped line winding and by coupling the audio signal receiving circuit means to the audio line through a transformer having a similar center-tapped line winding. If a DC voltage is applied by a signal applying circuit means to either center-tap, the other center-tap will be at substantially the same voltage, less any resistive drop over the audio line, which can be minimized through the use of low-current drain control signal receiving circuits connected to such other center-tap.

The invention has numerous potential applications, as for example in industry for remotely detecting abnormal machinery and process operating conditions evidenced by departures from a normal ambient sound level, and in the surveillance of warehouse buildings and schools for the detection of unauthorized entries to prevent burglary and vandalism. In the case of building surveillance, particularly in schools, the invention can be used not only for detection of unauthorized entries, but also for detecting other events, such as fire, flood and heating system failures, all of which require immediate attention. Because of the two-way control signal transmission capability afforded by the invention, numerous additional functions can be performed at the monitored area by remote control. For example, in the case of school surveillance, upon detection of an unusual noise level, a control signal can be transmitted from the remote monitoring location to turn on lights within and around the school building. This is particularly useful in discouraging vandalism since such action can be very effective to make would-be vandals realize their presence has been discovered and flee before inflicting any damage or theft, without the need for dispatching police to the scene on every occasion.

In the case of building surveillance applications wherein the buildings to be monitored are equipped with a public address system and telephone line service, the implementation of the invention can be accomplished with reduced cost. A conventional telephone line, preferably a direct line from the building to the remote monitoring location such as a police station, can be used as the audio line. At the beginning of the surveillance period, the several loudspeakers used for public address and intercommunication within the building during the normal work day can be switched into a common parallel connection to the input of the public address amplifier, and the output of such amplifier is then coupled to the telephone line by a transformer having a center-tapped line side winding. This will cause sounds occurring through the building to be picked up by the loudspeakers which then actually function as parallel microphones, and these sounds will be converted into corresponding audio signals carried by the telephone line to the remote monitoring location. At the remote location, the audio signal receiving circuit means can be simply an isolation or booster audio amplifier having an input coupled to the telephone line through a similar line center-tap transformer, and a rectifier circuit connected to the output of said amplifier to derive a DC signal from the monitored audio signals amplified thereby. The rectifier circuit need not consume the entire audio signal output of the amplifier, since what is desired is merely to obtain a DC signal which indicates the existing sound level at the monitored area, such as for example, a DC signal having an amplitude corresponding to the RMS value of the monitored audio signals.

Consequently, a loudspeaker, preferably provided with a disconnection switch, can be connected to the output of the receiving amplifier and in parallel with the rectifier circuit so as to permit an observer at the remote location to listen in on what is occurring at the monitored area. The DC sound intensity signal from the rectifier can be applied to subsequent instrumentation and/or indicator circuitry so as to give an audible or visible alarm at the remote location or to cause a predetermined control signal to be superimposed upon the line whenever the sound intensity at the monitored area deviates from a preselected level as indicated by the DC sound intensity signal. In addition, the DC sound intensity signal can be applied to a calibrated voltmeter for continuous visual sound level monitoring independent of any alarm conditions.

With a speaker disconnect switch, an observer at the remote location can listen in on the monitored area whenever an abnormal sound level thereat is indicated, or at random, without disturbing the continuation of the sound monitoring process.

It should be noted that ordinarily in the case of building surveillance, a rise in sound intensity at the monitored area signifies trouble, and thus for such purposes the monitoring/indicator instrumentation will be set to give an alarm whenever the DC sound intensity signal rises above a predetermined value. However, a decrease in monitored area sound intensity can also be indicative of trouble, particularly in applications wherein the invention is used to monitor the operation of motors, machinery, fluid flow, etc. In such applications, it frequently will be the case that a decrease in ambient sound level indicates the failure of a motor or other sound producing device or process, and consequently, the monitoring/indicator instrumentation will be set to give an alarm whenever the DC sound intensity signal falls below a predetermined value.

Furthermore, there are numerous potential applications of the invention wherein either an increase of sound intensity above a given upper level, or a decrease of sound intensity below a given lower level signifies trouble of one kind or another. For example, in a refrigerated warehouse, a certain minimum ambient sound level will exist by reason of the normal operation of refrigeration equipment, and thus should the warehouse suddenly become quiet, it would indicate the failure in the operation of such refrigeration equipment and the need for immediate servicing or other remedial action to prevent spoilage of goods. On the other hand, an increase in the sound level of such warehouse could indicate pilferage, which necessitates initiation of police or guard action. Hence, it becomes important to detect at the remote location, the occurrence of either an excessively low or an excessively high sound level at the monitored area, both of which can be done by the system of the invention.

Detection of low monitored sound levels can be readily accomplished by instrumentation circuits connected to the rectifier output and responsive to an undervoltage condition of the DC sound intensity signal thereof. Such instrumentation circuitry can be expediently arranged to activate a circuit for applying a predetermined control signal to the audio line in order to activate a switching circuit at the monitored area which switches the refrigeration equipment for operation by an auxiliary power source, as for example, when their primary power source fails. In such case, if the refrigeration equipment could be restored to a normal operating condition by switching to auxiliary power, the DC sound intensity signal would be restored to a non-alarm value, and the audible evidence of satisfactory refrigeration equipment operation could be additionally verified from the remote location simply by switching the loudspeaker thereat to a listen condition.

Detection of high monitored sound levels can be similarly accomplished by instrumentation circuits connected to the rectifier output and responsive to an overvoltage condition of the DC sound intensity signal thereof. In the case of those excess sound levels which indicate forcible entry or pilferage, the instrumentation circuits can be arranged to activate another circuit for applying a different predetermined control signal to the audio line in order to set off an alarm at the scene, and/or alert the police or guards stationed thereat. For example, upon reception of such control signal at the monitored area end of the audio line, a control signal receiver coupled thereto can be activated to set off an alarm either throughout the warehouse and/or in a guard station.

In addition to monitoring sound intensities and transmitting control signals from the remote location to responding control receivers at the monitored area, the system of the invention provides for verifying the electrical continuity of the audio line over which such audio signals and control signals are carried. By way of example, where a choice of 6, 12, 18 and 24 volts DC control signal levels is available, the lowest control signal level, i.e. 6 volts, can be reserved for audio line continuity verifying purposes. This can be accomplished by a signal applying circuit coupled to the monitored area end of the audio line and which continuously superimposes thereupon the 6 volts DC control signal. At the remote location end of the audio line a control signal receiving circuit is coupled thereto which is responsive to said 6 volts DC signal and the interruption thereof to indicate at the remote location the loss of audio line electrical continuity as signified by the interruption of the 6 volts DC signal.

The lowest available control signal voltage level is preferably utilized for audio line continuity verification because it accommodates confusion-free control signal operation with relatively simple equipment. For example, in a system wherein any one of these four control signal voltages can appear on the audio line at any given time, the control receiver used for verifying continuity can be constructed to give a continuity verification response whenever 6 volts DC or any higher control signal voltage is superimposed upon the audio line, because an audio line having electrical continuity will transmit a 12, 18 or 24 volts DC control signal just as well as it transmits a 6 volts DC signal. For practical purposes, it is desirable to provide for continuous audio line continuity verification rather than intermittent verification, whereas the control signal voltages reserved for other control functions will normally be applied only intermittently, since a single audio transmission line can only have a unique superimposed DC voltage level.

For the typical warehouse surveillance example mentioned, the 6 volts DC signal level can be reserved for audio line continuity verification, the 12 volts DC signal level can be reserved for effecting a switching to emergency power, and the 18 volts DC signal level can be reserved for alarm purposes, thus leaving the 24 volts DC signal level available for effecting performance of some other function.

As can be appreciated by the artisan, in many situations it will be desirable to transmit from the monitored area to the remote location additional information other than that which can be contained within the sound pick-up at the monitored area. For example, in the case of school building surveillance, a failure of the heating plant may occur of a type which can not be reliably sensed from the ambient sound level within the building. Particularly in winter, heating plant failure can cause the building temperature to drop below freezing thereby bursting pipes, causing flooding, and necessitating a shutdown for repairs. By using a thermostatically controlled switching circuit to apply a DC signal to the audio line from the monitored area end thereof, whenever the building temperature drops to a level indicative of heating plant failure, the occurrence of such failure can be communicated to the remote monitoring location. Similarly, another thermostatically controlled switching circuit can be provided to apply another distinctive DC signal to the audio line for communicating the occurrence of a fire within the building to the remote monitoring location.

With 6, 12, 18 and 24 volts DC signal levels available in such applications, reserving the 6 volts DC level for continuity verification, the 18 volts DC signal level is expediently reserved for heating plant failure indication, and the 24 volts DC, or highest available signal level is preferably reserved for fire alarm purposes.

Since a single audio line can have only one superimposed DC voltage signal condition existing at any given time, the various signal applying circuits, whether they be coupled to the line at its remote location end or at its monitored area end, are coupled through a blocking diode network which allows only the highest signal voltage level to be actually applied to the line, even though other signal applying circuits have been activated to apply their respective signals at the same time. In the example given, the 6 volts DC continuity verifying signal is normally applied to the line on a continuous basis, and the 12, 18 and 24 volts DC signals are selectively applied from time to time as their respective applicator circuits are activated either manually or automatically by the occurrence of predetermined conditions. If the system did not provide a blocking network to preclude the simultaneous coupling of different level signals to the line, undesirable short circuits would occur. Should the 12 volts DC signal applicator circuit be operated to superimpose its 12 volts DC signal on the line, the blocking network will preclude the concurrent coupling of the 6 volts DC continuity check signal to the line, so that only 12 volts DC appears thereupon. It should be noted that this 12 volts DC signal can also serve for verifying line continuity. However, if the 18 or the 24 volts DC signal applicator circuit is activated, either one will effect automatic decoupling of any 6 volt DC or 12 volt DC signal which happens to be on the line, so that only the highest voltage signal applicator will be able to place its signal on the line.

Therefore, in assigning signal voltage levels to the various control and indicator functions, the most urgent function is given the highest signal level and the other functions are given signal levels in the order of their intended priorities.

Accordingly, the system of the invention is adapted to accommodate the superposition of various DC signal levels upon the audio line, one signal at a time, from the monitored area end of the audio line to communicate information from the monitored area to the remote location, and/or from the remote location end of the audio line to communicate information from the remote location to the monitored area.

It is therefore, an object of the invention to provide a system for monitoring the sound level at a given area from a remote location and transmitting auxiliary signals between such remote location and the monitored area over the same transmission line used for sound monitoring.

Another object of the invention is to provide a system as aforesaid which can be readily incorporated into a conventional audio intercommunication system existing at the monitored area.

A further object of the invention is to provide a system as aforesaid which can utilize conventional telephone lines for transmission of such sound information and auxiliary signals between the monitored and remote locations.

A further object of the invention is to provide a system as aforesaid which provides means for selectively superimposing any one of a plurality of available auxiliary information and control signals upon the transmission line from either terminus thereof for reception at the other terminus thereof.

A further object of the invention is to provide a system as aforesaid including means for verifying at the remote location the electrical continuity of its transmission line.

A further object of the invention is to provide a system as aforesaid including circuit means responsive to the sound information signal received at the remote location to superimpose a predetermined auxiliary signal for reception at the monitored area whenever such sound information signal corresponds to a predetermined sound intensity at the monitored area.

A further object of the invention is to provide a system as aforesaid wherein the various auxiliary information and control signals are stabilized as to their pre-assigned characteristics to prevent confusion among their associated receiving circuits.

Still another and further object of the invention is to provide a system as aforesaid which can also be used as an audio intercommunication system for undetected listening at the remote location to sounds actually occurring within the monitored area.

Other and further objects and advantages of the invention will become apparent from the following detailed description and accompanying drawings in which.

Figure 1:
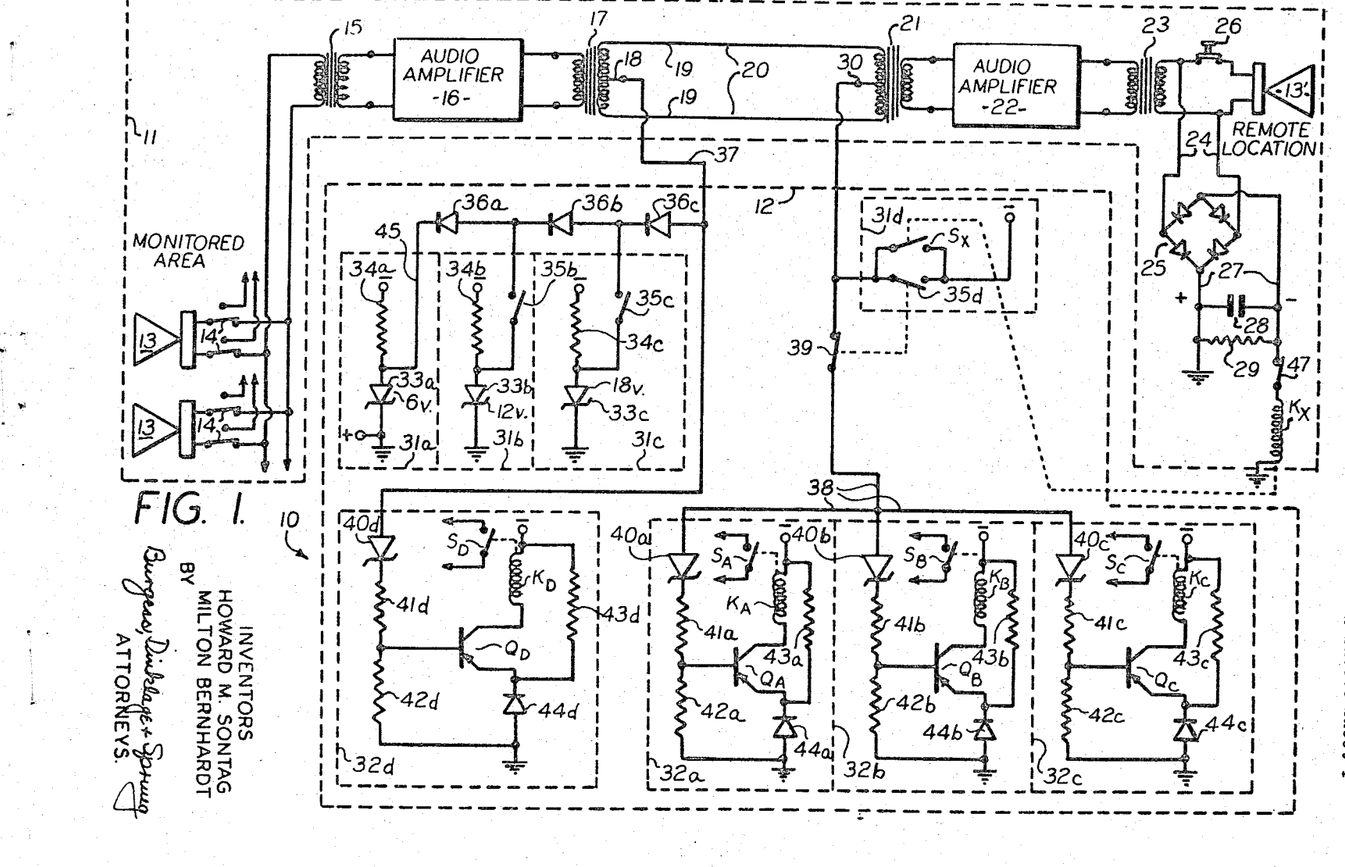
FIG. 1 is a schematic illustration of a remote sound monitoring and control system according to a preferred embodiment of the invention.

Referring now to FIG. 1, the remote sound monitoring and control system 10 of the invention can be expediently regarded as the combination of a sound monitoring circuit section 11 and an auxiliary signal circuit section 12, shown in dashed envelope form.

The sound monitoring circuit section 11 includes at least one transducer, and preferably a plurality of transducers, disposed for sensing sounds within the area to be monitored and generating an electrical signal containing information as to the intensity of such sounds. These transducers are expediently the loudspeakers 13 of a conventional audio intercommunication system or public address system which normally serves the building or other area to be monitored, and the loudspeakers 13 are preferably disposed at various separate locations within such area. As is commonly known, loudspeakers 13 are capable of reversible operation and can therefore be used as microphones as they are in the system of the invention.

When the system 10 is placed in operation, the loudspeakers 13 are connected in parallel by means of associated switches 14 to the primary winding of a common input transformer 15, the secondary winding of which is connected to the input of an audio amplifier 16. The output of amplifier 16 is connected to the primary of a line transformer 17, the secondary of which has a center-tap connection 18.

A pair of conductors 19 defining an audio transmission line 20 extending between the monitored area and the remote monitoring location are connected to the outer terminals of transformer 17 secondary and to the outer terminals of the center-tapped primary of another transformer 21 similar to transformer 17. The secondary of transformer 21 is connected to the input of an audio amplifier 22, the output of which is connected to the primary of a speaker transformer 23. The secondary or output winding of transformer 23 is connected in parallel to a loudspeaker 13' and to the input lines 24 of a rectifier network 25.

Sounds picked up by the loudspeakers 13 are converted thereby into corresponding audio frequency electrical signals which are combined by the transformer 15 into a composite sound information signal for amplification by the audio amplifier 16. This amplified sound information signal is conveyed from the monitored area to the remote monitoring location via the transmission line 20 and associated matching transformers 17 and 21. At the remote location, the gain of the sound information signal is adjusted to a convenient working level by the amplifier 22 and then delivered through transformer 23 to a receiving circuit means which can be regarded basically as the rectifier network 25 either alone or in combination with the loudspeaker 13'. The loudspeaker 13' simply allows an observer at the remote location to listen in on sounds occurring at the monitored area, and for convenience, a disconnect switch 26 is provided to allow such observer to turn off the loudspeaker 13' whenever desired.

The rectifier circuit 25 derives from the amplified sound information signal a DC output voltage signal which corresponds to the level of sound intensity at the monitored area.

For subsequent use of this DC output signal which appears across the rectifier network 25 output lines 27, a filter capacitor 28 and bleeder resistor 29 are provided to eliminate high frequency ripple components. The values of the capacitor 28 and resistor 29 can be selected through the application of conventional engineering techniques to provide a desired degree of fidelity between sound intensity at the monitored area and the corresponding DC analogue signal derived by the rectifier 25.

Depending upon the particular purpose for which the system 10 is intended, the subsequent processing of the rectifier 25 output signal can be varied. For example, where it is important to detect short duration, high intensity sounds, such as would produce rectified signals that might be masked by the integrating effect of the capacitor 28, said capacitor 28 can be eliminated and the rectifier output lines 27 connected directly to a peak voltage measuring circuit (not shown).

The center-tapped secondary winding of transformer 17, the center-tapped primary winding of transformer 21, and the line conductors 19 essentially define a transmission line 20 which can be classified as a simplex type transmission line 20. With this type of transmission line 20, superimposed DC signals can be carried between its monitored area and remote location ends without any interference with the transmission thereover of sound information contained in the form of audio signals. For example, a voltage source can be connected between the center-tap terminal 18 of transformer 17 and a common ground to operate a voltage sensitive, or load circuit connected between the center-tap terminal 30 of transformer 21 and ground. Conversely, the center-tap connections of the voltage source and load circuits can be interchanged with the same result. This makes it possible to provide a DC signal applying circuit coupled to one end of the transmission line 20 through a centertap 18, 30 connection which superimposes upon said line 20 a DC control or information signal for reception at the other end thereof by a signal receiving circuit coupled thereto through a centertap 30, 18 connection.

If desired, a plurality of signal applying circuits operable to selectively superimpose characteristic DC signals, one at a time, can be so coupled to the monitored area end of transmission line 20 to activate corresponding responsive signal receiving circuits coupled to the remote location end of said line 20. In addition, a plurality of signal applying circuits, similarly operable, can be coupled to the remote location end of the line 20 to activate corresponding responsive signal receiving circuits coupled to the monitored area end of the line 20 so that the system 10 is capable of accommodating the transmission of any of several available control/information signals from the remote location to the monitored area, and vice versa.

This is illustrated by way of example in FIG. 1 wherein the dashed envelope outlines identify individual signal applying circuits 31a, 31b, 31c and 31d, and their correspondingly associated signal receiving circuits 32a, 32b, 32c and 32d. As can be noted from FIG. 1, the signal applying circuits 31a, 31b, and 31c are coupled to the monitored area end of the transmission line 20 through center-tap connection 18, and the signal applying circuit 31d is coupled to the remote location end of transmission line 20 through center-tap connection 30. Accordingly, the signal receiving circuits 32a, 32b and 32c are coupled to the transmission line 20 through the remote location end center-tap connection 30 whereas the signal receiving circuit 32d is coupled to the monitored area end of line 20 through the center-tap 18 connection.

Although a variety of circuit configurations can be used for the signal applying circuits 31a–d and control signal receiving circuits 32a–d, the signal applying circuits 31a–c are preferably Zener diode stablized as are the control signal receiving circuits 32a–d. In FIG. 1, it is assumed that the control signal applied by the circuit 31d is the full DC power supply voltage, as for example −24 volts DC, and that such power supply (not shown) is already stabilized as to its rated output voltage, thereby dispensing with the need for any Zener diode stabilization in the circuit 31d. It should be further noted that while a positive terminal ground connection power supply arrangement is illustrated herein, such that the various DC control signals are negative voltage levels, a reversed polarity, i.e. negative ground, power supply connection can be substituted together with appropriate reversals in the polarity connections of the various diodes used.

In each signal applying circuit 31a–c there is provided a Zener diode 33a–c disposed for connection to a source of electricity through a series resistor 34a–c to derive a stabilized DC control signal having a predetermined voltage established by the breakdown characteristics of the corresponding Zener diodes 33a–c. For signal applying circuits 31b and 31c, switches 35b and 35c respectively serve for coupling the control signal voltage established by each of the Zener diodes 33b and 33c onto the transmission line 20. Because the circuit 31a is utilized for superimposing a 6 volt DC level on the transmission line 20 to verify the electrical continuity thereof, no corresponding switch is provided since for continuity verification purposes, the 6 volt signal provided by the circuit 31a is preferably superimposed on the transmission line 20 continuously.

While in general any number of signal applying circuits such as the circuits 31a–d can be provided, the total number of signal applying circuits is somewhat limited by the degree of resolution desired between the individual control signals. For example, with a 24 volts DC supply, to have a minimum resolution of 6 volts between control signals, the system 10 is essentially limited to four signal applying circuits 31a–d. Accordingly, the Zener diodes 33a–c are chosen to have reverse breakdown voltages of 6, 12 and 18 volts respectively. Thus, when swtiches 36b, 35c and 35d are open, only the 6 volts DC continuity verification signal from circuit 31a will be superimposed on the transmission line 20.

To prevent any attempted simultaneous application of more than one control signal voltage level through the transmission line 20, a diode blocking network formed by the series connected diodes 36a, 36b and 36c is provided. Under normal operating conditions, the cathode of the blocking diode 36a will be at −6 volts, and where switches 35b, 35c, 35d are open, this −6 volts DC level will be applied to the transmission line 20 through diodes 36b, 36c, and a line 37 connected to the center-tap 18, since there is no blocking potential applied to any of the diodes 36a–c.

If however, the switch 35b is closed, and switches 35c and 35d are open, a −12 volts DC potential will be applied to the anode of diode 36a thereby rendering it nonconductive. This will effect the removal of the −6 volt DC signal previously applied to the transmission line 20, and will substitute a −12 volts DC signal thereon.

Similarly, the closure of switch 35c will effect the removal of any lesser magnitude control signal voltage from the transmission line 20 and substitute a −18 volts DC signal level thereon, and the closure of switch 35d will remove any previously applied −6, −12, or −18 volts DC signal levels and substitute the −24 volts DC full power supply signal level therefor.

Consequently, in this embodiment of the invention, while any one of four discrete signal voltage levels are available for superposition on the transmission line 20, the highest voltage signal automatically has priority for actual occupancy of the line 20. Accordingly, the highest signal voltage level is preferably reserved for communicating the most important information or control function, and the lesser signal voltage levels are assigned in decreasing order to the correspondingly lesser important information/control functions.

It should be noted from FIG. 1, that it is not necessary that all signal applying circuits 31a–d be coupled to the same end of the transmission line 20, since as illustrated therein, three signal applying circuits 31a–c are coupled to the monitored area end of the line 20 via center-tap 18 and a fourth signal applying circuit 31d is coupled to the remote location end of line 20 via center-tap 30.

Theoretically, any signal receiving circuit 32a–d can be coupled to the same end of the transmission line 20 as its corresponding signal applying circuit 31a–d respectively. However, such an arrangement would not afford any advantage of using the line 20 for transmission of signals between the remote location and the monitored area. If for example, it should be desired to transmit a signal from an applying circuit operable at the monitored area to a responsive signal receiver also located within the monitored area, a direct signal transmission line (not shown) would be preferable for such purpose because it relieves the transmission line 20 from the burden of carrying a signal not needed at the remote location.

Should it be desired, the same signal applying circuit, such as for example the circuit 31b, can be used for concurrently applying a control signal to both the transmission line 20 for reception at the remote location by the responsive receiving circuit 32b, and to another direct transmission line (not shown) for reception by a duplicate receiving circuit (not shown) located within the monitored area. In this way, a signal applied to either end of the transmission line 20 can be used to synchronously operate duplicate control receivers, one at the remote location and the other at the monitored area.

For the sake of simplification, the embodiment of the invention shown in FIG. 1 features signal applying circuits 31a–d which operate corresponding control receivers 32a–d coupled to the opposite end of the transmission line 20.

A typical control receiver is exemplified by the circuit 32b, which is coupled to the remote location end of the line 20 through center-tap 30 and a signal distributor line 38 whenever a switch 39 is in its normally closed state. Whatever DC signal level appears on the line 20 is applied to the anode of a Zener diode 40b in circuit 32b. The cathode of the Zener diode 40b is returned to ground through the series-connected resistors 41b and 42b which serve as a voltage divider network to establish the potential of the base electron of a transistor QB. The emitter-to-base voltage of transistor QB is established by the aforesaid voltage divider network in conjunction with another voltage divider network defined by a resistor 43b and series-connected diode 44b, which is utilized not in the conventional manner but rather as a resistance which maintains a fixed emitter-to-ground potential of approximately 0.6 volt. The purpose of the Zener diodes 40a–d in circuits 32a–d is to assure that transistors QA–QD will be put into an emitter-to-collector conduction state only when the signal voltage on the line 20 is sufficient to effect reverse breakdown of designated Zener diodes of the group 40a–d. For example, the circuit 32a which is intended to be responsive to a −6 volt DC or greater magnitude signal level, has a Zener diode 40a with a reverse breakdown voltage of approximately 4 volts. Zener diode 40b in circuit 32b has a reverse breakdown voltage of approximately 10 volts to make the circuit 32b reliably responsive to a −12 volts DC or greater magnitude signal level. Likewise, Zener diodes 40c and 40d respectively are chosen with reverse breakdown voltages of approximately 16 and 22 volts so that their associated circuits 32c and 32d will be responsive respectively to −18 volts and −24 volts DC signal levels. To assure reliable operation of the circuits 32a–d, the Zener diodes 40a–d are respectively chosen with breakdown voltages approximately 2 volts less than their intended receiving circuit minimum response signal level.

The individual transistors QA–QD are biased into a nonconductive state as between their emitter and collector electrodes whenever their associated Zener diodes 40a–d are in the nonconductive or blocking state. This biasing is effected by the resistors 42a–d, 43a–d, and the diodes 44a–d. In series with the collector of each transistor QA–QD, the coil of a relay KA–KD is connected. Whenever a transistor QA–QD is rendered conductive by the presence on the transmission line 20 of a signal level sufficient to break down the associated Zener diode 40a–d, such relay KA–KD is energized and its switching contact set SA—SD is operated.

This means that in the case of the circuit 32b, transistor QB will experience emitter-to-collector conduction sufficient to energize the coil of relay KB whenever a signal voltage of −12 volts DC or greater magnitude is applied to transmission line 20, Zener diode 40b being selected for such purpose to have a reverse breakdown voltage of 10 volts so that a −12 volts DC or greater magnitude signal level will effect breakdown thereof, but the −6 volts DC signal will not. Accordingly, the closure of switch 35b at the monitored area will effect the operation of another switch SB at the remote location.

As is commonly known in the prior art, the operation of a switch, such as any of the switches SA–SD of circuits 32a–d, where such operation results in an open or a closed circuit switching state, can be utilized to convey information to an indicator/display device (not shown), or to control the operation of practically any electrically operable or controllable device (not shown). Likewise, the operation of a switch such as any of the switches 35b, 35c, 35d, can be effected manually or automatically in response to the value of some physical parameter.

In a typical application of the invention, the switch 35b can be a thermostatically controlled switch 35b responsive to the temperature within a building to be remotely monitored, and is so constructed and arranged as to close or otherwise effect the application of a —12 volts DC signal to the transmission line 20 whenever the building temperature drops to a pre-established low value indicative of heating plant failure. Thus, the presence of the —12 volts DC signal on line 20 as sensed by the receiving circuit 32b means heating plant failure. It should be noted that such —12 volts DC signal will also produce a response in receiving circuit 32a, the continuity verification receiver, since transistor QA will be rendered conductive by any signal —6 volts DC or greater magnitude. Actually, any signal level greater than —6 volts DC conveys in addition to its basic information content, an information bit indicating transmission line 20 continuity.

The switch contacts SB can be connected to illuminate an indicator lamp (not shown) or to activate an alarm device, such as a bell, buzzer, etc., whenever relay KB is energized by the receiving circuit 32b response to such —12 volts DC signal, so that an observer at the remote location can be advised of the heating plant failure at the monitored building. Likewise, the switch contacts SA can be connected to activate an alarm device to signify at the remote location the loss of continuity in transmission line 20, as represented by the deenergization of relay KA whenever receiving circuit 32a fails to sense the minimum level —6 volts DC signal.

The switch 35c can be arranged to close and apply a —18 volts DC signal level to the line 20 whenever an intruder actuates one or more alarm switches, such as by opening or closing a window or door within the monitored building. This will cause the receiving circuit 32c at the remote location to energize relay KC thereby operating its switching contacts SC to in turn activate another alarm device (not shown) informing an observer at the remote location of such intrusion within the monitored building.

To prevent the simultaneous erroneous indication of a heating plant failure by reason of the fact that receiving circuit 32b will also respond to a —18 volts DC signal, relay KC can be expediently provided with an additional set of normally closed switching contacts (not shown) connected in series with the switch contacts SB, so that any heating plant failure indicator device at the remote location that would normally be activated by a —12 volts DC signal in the absence of the higher priority —18 volts DC signal would be prevented from such activation by a —18 volts DC signal causing such normally closed contact set to open.

The signal applying circuit 31d which is operable at the remote location, can be utilized to effect the activation of an alarm device, such as a siren (not shown) audible within and preferably also without the monitored building. The activation of such siren is effected through the closure of switch contacts SD whenever relay KD is energized by receiving circuit 32d in response to a —24 volts DC signal applied to the transmission line 20 by the closure of switch 35d. Switches 35d and 39 are preferably slaved for operation in unison so that whenever switch 35d closes to apply the —24 volts DC signal to the line 20, switch 39 opens to disconnect the receiving circuits 32a, 32b and 32c from said line 20. This is particularly useful because none of the receiving circuits 32a, 32b, 32c are intended to respond to such —24 volts DC signal, and the opening of switch 39 reduces the power consumed in the operation of the system 10 by eliminating the power drain of these three receiving circuits 32a–c which would ordinarily result were switch 39 to remain closed.

Where an intruder has entered the monitored building, such entry and the activities of the intruder within the building after closing hours will normally result in a significant rise in the ambient sound level within the building. Such increased ambient sound level will ordinarily exist whether or not the intruder is detected by any other device such as may effect operation of the signal applying circuit 31c. To provide for the transmission of a —24 volts DC alarm signal from the remote location in such cases, a normally open set of switch contacts SX is connected in parallel with the switch 35d. The switch contacts SX are operated by a relay KX the coil of which is connected across the DC signal output of the rectifier circuit 25. Relay KX is so chosen as to be energized whenever the DC output of rectifier 25 corresponds to an audio signal level on lines 24 indicative of an abnormally high ambient sound level at the monitored building. A reset switch 47 is provided in series with the coil of relay KX to permit an observer at the remote location to selectively interrupt the transmission of a —24 volts DC signal initiated automatically in response to the sensed ambient sound level at the monitored building. This is particularly useful in preventing a positive feed back type of operation which would place the system 10 in a locked up condition in cases where the —24 volts DC signal is used to activate a siren at the monitored building within the pick up range of the sensing speakers 13. In such case, unless the reset switch 47 were provided, the initial excess sound level which triggered relay KX into operation would be supplemented by sounds from the siren which would thereby produce an audio signal input to the rectifier circuit 25 that would hold relay KX in an energized state. For practical purposes, any siren used would necessarily have to produce an ambient sound level higher than that normally existing within a building such as schools after closing hours, and generally such siren output would be considerably higher than any noise made by an intruder. By opening the reset switch 47, it is thus possible for an observer at the remote location to turn off the siren at the monitored building and then close switch 26 to listen in on activities within the building through the speaker 13′.

In certain applications of the invention, to make a greater number of information or control signals available for transmission over the line 20, it will be desirable to design each signal receiving circuit so that it responds only to one pre-asigned signal voltage level and ignores all others, rather than to make such signal receiving circuits responsive to all signal voltages equal to and greater in magnitude than individually assigned voltage levels as in the case of the receiving circuits 32a–c.

For example, if the signal receiving circuits intended to be responsive to —6, —12, —18 and —24 volts DC signals respectively are constructed so that they will respond only to signal voltages within a 1 volt range on either side of their nominal signal voltage response levels, a considerable saving in the available signal voltage spectrum can be achieved because only a 2 volts range need be reserved for each distinct signal.

Figure 2:
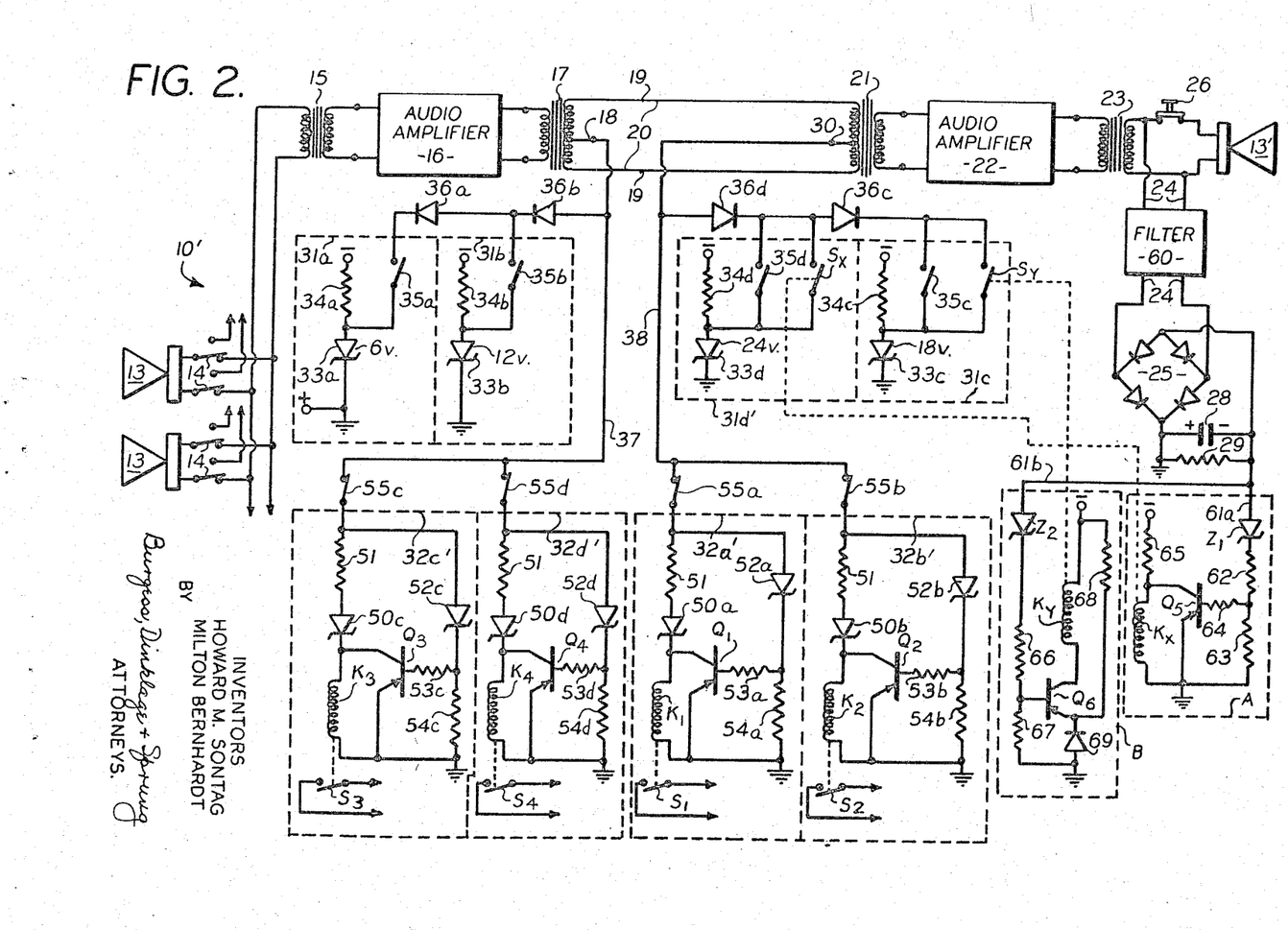
FIG. 2 is a schematic illustration of a remote sound monitoring and control system according to another embodiment of the invention, featuring additional auxiliary signal transmission and reception capabilities.

FIG. 2 exemplifies a system 10′ featuring such signal receiving circuits 32a′, 32b′, 32c′ and 32d′ which are designed to respond only to signals within the ranges —5 to —7 volts DC, —11 to —13 volts DC, —17 to —19 volts DC, and —23 to —25 volts DC respectively. Essentially, the same type of signal applying circuits 31a, 31b, 31c are used to selectively apply —6, —12 and —18 volts DC signal levels to the transmission line 20, except that their Zener diodes 33a–c are preferably chosen with closer tolerances, just in case additional signal applying and receiving circuits (not shown) are to be incorporated into the system 10′.

Assuming that no signal level below —5 volts DC is to be used, and that any future additional signal applying and receiving circuits incorporated in the system 10′ will operate over signal voltage ranges spaced apart from the aforementioned voltage ranges by 1 volt, it will be apparent that there are three additional signal voltage ranges available, namely —8 to —10 volts DC, —14 to —16 volts DC, and —20 to —22 volts DC. The allocated signal voltage ranges and those available for future use are best summarized in the following table I wherein all voltages are understood to be negative in polarity for the specific circuitry shown in FIG. 2.

TABLE I

| Signal Applying and Receiving Circuits | Nominal Signal Voltage Level, V. DC | Allocated Signal Voltage Range, V. DC |
|---|---|---|
| 31a, 32a' | 6 | 5–7 |
| Unassigned | 8 | 8–10 |
| 31b, 32b' | 12 | 11–13 |
| Unassigned | 15 | 14–16 |
| 31c, 32c' | 18 | 17–19 |
| Unassigned | 21 | 20–22 |
| 31d, 32d' | 24 | 23–25 |

To assure that the highest level signal voltage, i.e. the −24 v. DC signal will be maintained constant regardless of any fluctuations in power supply (not shown) operating conditions, and independently of any stabilization means provided therein, the signal applying circuit 31d' is of the same basic design as the circuits 31a–c and utilizes a Zener diode 33d which maintains the signal voltage applied by circuit 31d' at −24 ±0.5 v. DC. The circuit 31d' is thus preferable over the circuit 31d of FIG. 1 since it provides additional assurance that the signal applied thereby can be identified positively without confusion by the receiving circuit 32d'.

For purposes of example, the system 10' has been illustrated as having two signal applying circuits 31a and 31b coupled to the monitored area end of line 20 for transmitting their respective −6 volts DC and −12 volts DC signals to corresponding receiving circuits 32a and 32b coupled to the remote location end of the line 20, and as having two signal applying circuits 31c and 31d' coupled to the remote location end of line 20 for transmitting their respective −18 volts DC and −24 volts DC signals to corresponding receiving circuits 32c' and 32d' coupledw to the monitored area end of the line 20. The number of signal applying and receiving circuit sets can of course be varied within the limitations of the signal voltage spectrum availability as indicated in table I.

While in FIG. 2, the signal applying circuit 31a has been shown as having a switch 35a operable to selectively apply a −6 volts DC signal to the line 30 for reception by receiving circuit 32a', this switch 35a can be maintained in a closed circuit state or replaced by a jumper (not shown) as where the −6 volts DC signal is to be used for verifying the continuity of the line 20. Because the signal applying circuits 31a and 31b are coupled to the monitored area end of line 20, it follows that line 20 continuity at the remote location end thereof can be verified positively positively whenever a signal of −12 volts DC or lesser magnitude is sensed thereat. Since the signal applying circuits 31c and 31d' are coupled to the remote location end of line 20 through the same line 38 used for coupling the receiving circuits 32a' and 32b' thereto, the presence of a signal greater in magnitude than −12 volts DC on line 38 does not verify continuity of the line 20, because any such signal sensed in line 38 could only originate through one of the signal applying circuits 31c or 31d'. Accordingly, where the signal applying circuit 31a is reserved for continuity verification purposes, the receiving circuit 32a' is arranged to give a continuity verification response for any signal within the range −5 to −13 volts DC. In this way, the closure of switch 35b in circuit 31b whenever a −12 volts DC signal is applied to line 20 thereby will not result in any interruption of the continuity verification function. By making the receiving circuit 32a' non-responsive to signals greater in magnitude than −13 volts DC, the application of a −24 volts DC or −18 volts DC signal by either of the circuits 31d' or 31c will not cause a spurious indication of line 20 continuity, which by its nature must necessarily be verified by a signal originating at the end of the line 20 opposite to that at which it is sensed.

Each of the receiving circuits 32a'–32d' includes a relay K1–K4, the coil of which is connected in series with a Zener diode 50a–d and a current limiting resistor 51. The Zener diodes 50a–d serve for limiting the operation of their respectively associated relays K1–K4 to conditions where the DC signal voltage on line 20 is above the minimum response level individually set for each receiving circuit 32a'–32d'.

Transistors Q1–Q4 are connected with their emitter and collector electrodes in shunt across corresponding relay K1–K4 coils. A second set of Zener diodes 52a–d, together with resistors 53a–d and 54a–d serve for limiting the operation of relays K1–K4 to conditions where the DC signal voltage on line 20 is below the maximum response level individually set for each receiving circuit 32a'–32d'. Accordingly, the pair of Zener diodes 50a and 52a, 50b and 52b, 50c and 52c, 50d and 52d associated with each receiving circuit 32a'–32d' function to make the relays K1–K4 in that circuit operate whenever the signal voltage on line 20 is within the prescribed response range.

As a typical example, receiving circuit 32b' is intended to be responsive to only the signal applied by circuit 31b, i.e. the nominal −12 volts DC signal, and to allow reasonable tolerances compatible with positive signal identification, circuit 32b' is designed to energize its relay K2 whenever the DC voltage on line 20 is within the range −11 to −13 volts DC. For all other signal voltages, relay K2 is to remain de-energized.

Switches 55a–d are provided to permit decoupling of the receiving circuits 32a' and 32b' from the signal line 38, and to permit decoupling of receiving circuits 32c' and 32d' from signal line 37, if desired, and these switches 55a–d are normally closed so that whatever signal voltage is applied to the line 20 is also applied simultaneously to each receiving circuit 32a'–32d'.

In circuit 32b', the signal voltage in line 20 is impressed across the series-connected resistor 51, Zener diode 50b and relay K2 coil. In addition, the same line 20 signal voltage is also impressed across the series-connected Zener diode 52b and resistor 54b. The values of resistors 53b and 54b are chosen so that the base electrode of transistor Q2 is biased for complete emitter to collector current cut-off whenever Zener diode 52b is nonconductive. Thus, when Zener diode 52b is nonconductive, the transistor Q2 connected in shunt with relay K2 coil will be essentially an open circuit from emitter to collector and whatever current if any flows through relay K2 coil will be established by its own resistance, the Zener diode 50b, and resistor 51. Resistor 51 is selected to limit the emitter to collector current flow in transistor Q2 to a safe value when rendered conductive by the breakdown of Zener diode 52b.

Zener diode 50b is chosen to have a reverse breakdown voltage which will render it conductive to pass a current through the coil of relay K2 sufficient to reliably operate same whenever the line 20 signal voltage is −11 volts DC or greater in magnitude. Zener diode 52b is chosen to have a reverse breakdown voltage which will render it conductive whenever the signal voltage on line 20 is −13 volts DC or greater in magnitude. For any line 20 signal voltage up to −11 volts DC, Zener diode 50b will preclude operation of relay K2, and of course, Zener diode 52b will be nonconductive. For signal voltages between −11 volts DC and −13 volts DC, Zener diode 50b will be conductive to operate relay K2 and hold same in the operate state, since up to −13 volts DC Zener diode 52b is nonconductive and maintains transistor Q2 in a current cut-off condition. For signal voltages above −13 volts DC in magnitude, Zener diode 50b remains conductive, but Zener diode 52b breaks down to render transistor Q2 conductive. This causes the current flowing through Zener diode 50b to pass primarily through the emitter collector circuit of transistod Q2 thereby returning relay K2 to its non-operate state.

The signal receiving circuits 32a'–32d' are basically similar in component arrangement and operate in a similar manner except as to individual differences in their response to various signal voltage levels as established by appropriate selection of their component values. These circuits 32a'–32d' are basically described in the Zener Diode Handbook published by the International Rectifier Corporation and serve to illustrate how the basic invention exemplified in FIG. 1 can be modified so that each signal receiving circuit is responsive only to a unique pre-assigned signal voltage rather than to all signal voltages greater in magnitude than a preassigned value.

It should be noted from the foregoing that the signal voltage response range for each of the receiving circuits 32a'–32d' is essentially established by the reverse breakdown voltages of the Zener diode pairs 50a and 52a, etc., associated with each of said circuits, and this range can be made wider or narrower as desired simply by an appropriate choice of such Zener diode characteristics.

As between the receiving circuits 32a–32d of the FIG. 1 system 10 and the receiving circuits 32a'–32d' of the FIG. 2 system 10', the receiving circuits 32a–32d offer the advantage of requiring less power transmission over the line 20. In the system 10, the only DC power which need be carried over the line 20 is that required to control the operation of the various transistors QA–QD since the power for operating the relays KA–KD is supplied locally, whereas in the system 10', the power for operating the transistors Q1–Q4 and the relays K1–K4 is carried over the line 20.

In terms of ultimate switch operations, it can be stated generally for the system 10' that the operation of switches 35a, 35b in response to events occurring or conditions existing at the monitored area will respectively effect automatic operation of the relay K1 switch contacts S1 and the relay K2 switch contacts S2 at the remote location, where receiving circuits 32a' and 32b' are each arranged for response to the unique signal voltage levels produced by circuits 31a and 31b respectively. Where circuit 32a' is made responsive to both of these signal voltages, for continuity verification purposes, then under normal continuity conditions, switch contacts S1 will be held in the operate state and switch contacts S2 will operate whenever a −12 volts DC signal is applied to line 20 by circuit 31b. Likewise, the operation of switch 35c in circuit 31c is effected at the remote location either manually or automatically in response to an event or condition thereat, will cause operation of relay K3 switch contacts S3 at the monitored area.

For purposes of illustrating some of the many capabilities of the invention, in FIG. 2 a bandpass filter 60 has been installed in the audio signal lines 24 to the rectifier circuit 25, and normally open switch contacts SX and SY operated by relays KX and KY respectively are connected in parallel with switches 35d and 35c respectively.

The bandpass filter 60 serves to limit the audio signal voltages applied to rectifier 25 to those within a predetermined frequency range. In many practical applications of the invention, the sounds of importance at the monitored area will be within a limited frequency range, such as for example, high frequency sounds emitted by machinery under normal operating conditions, or low frequency sounds created by intruders. With the filter 60 installed in the audio signal path to rectifier 25, the rectified DC signal output voltage thereof will represent the intensity level of sounds at the monitored area within the frequency range of the filter 60, and in general, sound of other frequencies will be ignored by the system 10' in its measurement of monitored area sound intensity. The characteristics of the filter 60 can of course be varied as desired in a particular case, or the filter 60 can be omitted entirely where it is desired to measure the intensity of monitored area sounds without regard to frequency.

The relay KX is intended to operate in response to a DC sound intensity signal from rectifier 25 corresponding to a sound intensity at the monitored area below a predetermined level. For example, where machinery at the monitored area emits sounds of a given intensity under normal operating conditions, a decrease in the monitored sound intensity below such level, or the absence of such sounds, signifies a machine failure. Through the operation of relay KX and the resultant closure of its switch contacts SX, the invention provides for the transmission of a −18 volts DC signal by circuit 31c back to the monitored area for reception thereat by receiving circuit 32c'. Circuit 32c' responds by closing its switch contacts S3, which can then operate an alarm (not shown) to indicate such machine failure to an attendant somewhere in the monitored area but not in the immediate presence of the failed machine, or the switch contacts S3 can activate auxiliary machinery (not shown) to take over the function of such failed machine. In any case, the closure of contacts S3 represents a generalized physical response to a condition at the monitored area which has been automatically detected at the remote location by analysis of the monitored area sound pick-up through system 10', such response being effected by transmission of a specific signal back to the monitored area.

The relay KY is intended to operate on the same general principles, but rather to be responsive to a sound intensity at the monitored area above a predetermined maximum level, which need not be the same as for operation of relay KX. In many cases, an increase in monitored area sound level will warrant effecting a response function by signal transmission back to the receiving circuit 32d' thereat. Whenever the sound level at the monitored area rises above this predetermined maximum value, relay KY operates to close its switch contacts SY thereby transmitting a −24 volts DC signal back to receiving circuit 32d' and closing switch contacts S4 thereof.

By connecting switch contacts SX in parallel with switch 35d and switch contacts SY in parallel with switch 35c, the same respective response functions at the monitored area can be accomplished automatically in response to monitored sound intensity, and independently thereof through operation of such switches 35c and 35d. It should be noted that the invention does not require the inclusion of switch contacts SX, SY, and their associated operating circuits A and B respectively, but rather is adapted to accommodate them as optional features. The connections of such switch contacts SX, SY in circuits 31d, 31c can, of course, be interchanged to provide the highest priority −24 volts DC signal for initiating the monitored area response to a low sound intensity condition, and the lesser priority −18 volts DC signal for responding to a high sound intensity condition.

Both circuits A and B are connected by lines 61a, 61b respectively to the negative output line of rectifier 25 to receive the DC sound intensity signal thereof. In circuit A, this signal is applied to a Zener diode Z1 connected in series with resistors 62 and 63. The base electrode of a transistor Q5 is connected to the junction of resistors 62 and 63 through a series resistor 64. The Zener diode Z1, and resistors 62, 63, 64, are chosen so that when the sound intensity signal is below a given value, the transistor Q5 is biased for emitter to collector current cut-off, and when the sound intensity signal is above such value, Zener diode Z1 conducts and thereby shifts the bias of transistor Q5 for emitter to collector current conduction, preferably a saturating current conduction state. The coil of relay KX is connected in shunt across the collector and emitter electrodes of transistor Q5, and connected in series with a resistor 65, similar to the circuit configuration of circuits 32a'–32d', but without any series Zener diode 50a–d counterpart. When transistor Q5 is biased for current conduction, as it will be whenever the monitored area sound intensity is above the prescribed minimum level, the primary current flow will be through the emitter collector circuit of transistor Q5 and resistor 65, thus maintaining relay KX in a substantially de-energized state, at least to the extent where its switch contacts SX do not close. Should the monitored area sound intensity fall below this minimum level, as indicated by a drop in the DC sound intensity signal from rectifier 25, Zener diode Z1 will cease to conduct and transistor Q5 will become biased for current cut-off. Under such conditions, the primary current flow from the local power supply (not shown) will be through resistor 65 and the coil of relay KX, thereby energizing it into the operate state to close switch contacts SX.

Circuit B is basically similar in design to circuits 32a–32d shown in FIG. 1, and is arranged so that the DC sound intensity signal is applied to a Zener diode Z2 connected in series with resistors 66 and 67 to ground. The junction of resistors 66 and 67 is connected to the base electrode of a transistor Q6, with said resistors 66, 67, another resistor 68, Zener diode Z2, and another diode 69 being chosen so that when the sound intensity signal is below a pre-set maximum value, Zener diode Z2 will be nonconductive and transistor Q6 will be biased for emiter to collector current cut-off. At and above such maximum value, Zener diode Z2 conducts to shift the bias on transistor Q6 for emiter to collector current conduction, preferably saturating conduction. Whenever transistor Q6 is in such forward conduction state, the coil of relay KY is energized, thereby causing it to operate and close its switch contacts SY which are normally open whenever relay KY is deenergized by current cut-off through transistor Q6.

From the foregoing description of the invention in its various embodiments, it will become apparent to the artisan that the remote monitoring and control system of the invention is susceptible of numerous variations and modifications not specifically described herein, but which will become obvious. The invention is intended to be limited only by the following claims in which we have endeavored to claim all inherent novelty.

What we claim is:

1. A remote monitoring system which comprises a sound sensing circuit means including at least one transducer disposed for sensing sounds within an area to be monitored and generating an electrical signal containing information as to the intensity of such sounds, circuit means defining a transmission line coupled to said sound sensing circuit means for transmitting the sound information signal therefrom to a remote location, a signal receiving circuit means disposed at said remote location and coupled to the transmission line to receive said sound information signal, said receiving circuit means being responsive to said sound information signal to derive therefrom an output signal corresponding to the sound intensity at the monitored area, a signal applying circuit means coupled to said remote end of said transmission line to superimpose thereupon a characteristic DC control signal whenever said output signal corresponds to a predetermined level of sound intensity at the monitored area for reception at the monitored end thereof, and a control signal receiving circuit means coupled to said monitored end of the transmission line for receiving such control signal and responding thereto.

2. The system according to claim 1 wherein said signal applying circuit means is coupled to the monitored area end of the transmission line to continuously superimpose thereupon a control signal for verifying the electrical continuity of said transmission line between its monitored area end and its remote location end, and wherein said control signal receiving circuit means is coupled to the remote location end of the transmission line and is responsive to said control signal and the interruption of reception thereof to indicate at the remote location the loss of said electrical continuity as signified by the interruption of said control signal.

3. The system according to claim 1 including an additional circuit means coupled to the monitored area end of the transmission line to continuously superimpose thereupon a characteristic DC signal for verifying the electrical continuity of the transmission line between its monitored area and remote location ends, and a receiving circuit means coupled to the remote location end of the transmission line to receive said DC signal, said receiving circuit means being responsive to said DC signal and the interruption thereof to indicate at the remote location the loss of said electrical continuity as signified by the sensed interruption of said DC signal.

4. The system according to claim 1 wherein said signal applying circuit means is coupled to the remote location end of the transmission line for selectively superimposing thereupon a DC control signal for reception by the control signal receiving circuit means, said control signal receiving circuit means being disposed at the monitored area and coupled to the monitored area end of the transmission line for response to said DC control signal.

5. The system according to claim 1 wherein said signal applying circuit means is coupled to the monitored area end of the transmission line for selectively superimposing thereupon a DC control signal for reception by the control signal receiving circuit means, said control signal receiving circuit means being disposed at the remote location and coupled to the remote location end of the transmission line for response to said DC control signal.

6. The system according to claim 1 including a first signal applying circuit means coupled to the monitored area end of the transmission line for selectively superimposing thereupon a first characteristic DC control signal, a first control signal receiving circuit means disposed at the remote location and coupled to the remote location end of the transmission line for response to said first DC control signal, a second signal applying circuit means coupled to the remote location end of the transmission line for selectively superimposing thereupon a second characteristic DC control signal, and a second control signal receiving circuit means disposed at the monitored area and coupled to the monitored area end of the transmission line for response to said second DC control signal.

7. The system according to claim 1 including a plurality of signal applying circuits coupled to the monitored area end of the transmission line to superimposed thereupon individually characteristic DC control signals in response to the occurrence of predetermined events within the monitored area, and a similar number of signal receiving circuits coupled to the remote location end of the transmission line to receive said control signals, each of said signal receiving circuits being responsive to an assigned characteristic DC control signal to indicate at the remote location the occurrence of the monitored area event communicated thereby.

8. The system according to claim 1 wherein said sound information signal receiving circuit means includes a rectifier circuit responsive to said sound information signal to derive therefrom a DC output signal, the voltage of which corresponds to the sound intensity at the monitored area as represented by said sound information signal.

9. The system according to claim 8 wherein the signal applying circuit is responsive to the DC output signal of the rectifier circuit to superimpose a characteristic DC control signal on the transmission line whenever the sound intensity at the monitored area rises above a predetermined value as represented by the rectifier circuit output signal.

10. The system according to claim 8 wherein the signal applying circuit is responsive to the DC output signal of the rectifier circuit to superimpose a characteristic DC control signal on the transmission line whenever the sound intensity at the monitored area falls below a predetermined value as represented by the rectifier circuit output signal.

11. The system according to claim 1 wherein the sound information signal receiving circuit means includes a rectifier circiut operative to derive from said sound information signal a DC output signal the voltage of which corresponds to the level of sound intensity at the monitored area as represented by said information signal, and including a plurality of signal applying circuits coupled to the remote location end of the transmission line and each responsive to said rectifier output signal to superimpose upon the transmission line a predetermined characteristic DC control signal whenever the rectifier output signal corresponds to a pre-assigned monitored area sound intensity level, and a similar plurality of signal receiving circuits coupled to the monitored area end of the transmission line, each of said signal receiving circuits being responsive to the characteristic DC control signal applied from the remote location by a corresponding signal applying circuit.

12. The system according to claim 1 wherein said signal applying circuit means includes a Zener diode disposed for connection to a source of electricity to derive therefrom a stabilized DC control signal having a predetermined voltage characteristically established by said Zener diode, and switching means coupled to said Zener diode and to said transmission line for superimposing thereupon said stabilized DC control signal.

13. The system according to claim 1 including a plurality of signal applying circuit means each having a Zener diode disposed for connection to a source of electricity to derive therefrom a stabilized DC control signal of predetermined voltage characteristically established by said Zener diode, each signal applying circuit means having a Zener diode which establishes a DC control signal unique in voltage with respect to that of all other signal applying circuit means in said plurality thereof, a switching means associated with each signal circuit means for superimposing the DC control signal thereof upon the transmission line, and a diode blocking network coupled to each of said switching means and to the transmission line to permit only the highest voltage DC control signal to be superimposed at any time on the transmission line by a switching means where a plurality of such switching means are operated for applying their respectively associated control signals to the transmission line.

14. The system according to claim 1 wherein said signal applying circuit means is operable to superimpose a fixed voltage level DC control signal upon the transmission line, and wherein said control signal receiving circuit means includes a Zener diode circuit responsive to said fixed DC voltage level control signal to establish a predetermined circuit condition whenever said control signal is superimposed on the transmission line.

References Cited

UNITED STATES PATENTS

| | | | |
|---|---|---|---|
| 2,423,649 | 7/1947 | Horvitch | 340—276 |
| 3,017,550 | 1/1962 | Dickson | 307—318 X |
| 3,069,673 | 12/1962 | Ward et al. | 340—276 |
| 3,143,055 | 5/1964 | Le Cronier et al. | 307—318 X |
| 3,167,755 | 1/1965 | Larrick et al. | 340—261 |

ROBERT L. GRIFFITH, Primary Examiner

W. S. FROMMER, Assistant Examiner

U.S. Cl. X.R.

179—2, 5; 340—261, 276

PO-1050
(5/69)

UNITED STATES PATENT OFFICE
CERTIFICATE OF CORRECTION

Patent No. 3,475,751         Dated  Oct. 28, 1969

Inventor(s)  HOWARD M. SONTAG and MILTON BERNHARDT

It is certified that error appears in the above-identified patent and that said Letters Patent are hereby corrected as shown below:

Column 8, line 75, "36b" should be --35b--; column 13, line 5, 2nd column heading, item 2, "8" should be --9--; column 13, line 33, "coupledw" should be --coupled--; column 13, line 39, "30" should be --20--; column 17, line 16, "emiter" should be --emitter--; column 17, line 18, "emiter" should be --emitter-- column 18, line 38, "superimposed" should be --superimpose--; column 18, line 70, "circiut" should be --circuit--; column 19, line 28, after "signal" insert --applying--; column 20, line 22, "3,143,055" should be --3,134,055--

SIGNED AND
SEALED
MAY 19 1970

(SEAL)
Attest:

Edward M. Fletcher, Jr.
Attesting Officer

WILLIAM E. SCHUYLER, JR.
Commissioner of Patents